US005401698A

United States Patent [19]

Mottet et al.

[11] Patent Number: 5,401,698
[45] Date of Patent: Mar. 28, 1995

[54] CERAMIC WELDING POWDER MIXTURE

[75] Inventors: Léon P. Mottet, Medina; Charles M. Zvosec, Lorain; Stephen D. Cherico, North Royalton, all of Ohio; Alexandre Zivkovic, Uccle, Belgium; Guy van Marcke de Lummen, Ottignies, Belgium; Jean Moreau, Charleroi, Belgium; Pierre Robyn, Nivelles, Belgium

[73] Assignees: Glaverbel, Brussels, Belgium; Fosbel International Ltd., Birmingham, United Kingdom

[21] Appl. No.: 73,056

[22] Filed: Jun. 8, 1993

Related U.S. Application Data

[60] Division of Ser. No. 896,908, Jun. 19, 1992, Pat. No. 5,242,639, which is a continuation of Ser. No. 513,489, Apr. 23, 1990, abandoned.

[30] Foreign Application Priority Data

Jul. 25, 1989 [GB] United Kingdom ........... 8916951

[51] Int. Cl.⁶ ............................................. C04B 35/52
[52] U.S. Cl. ................................. 501/105; 501/103; 501/132; 501/117; 501/118
[58] Field of Search ............... 427/426, 427, 422; 264/30; 501/94, 103, 105, 110, 117, 118, 126, 127, 132

[56] References Cited

U.S. PATENT DOCUMENTS

| | | | |
|---|---|---|---|
| 2,968,083 | 1/1961 | Lentz et al. | 25/155 |
| 3,082,104 | 3/1963 | Belz | 106/58 |
| 3,141,917 | 7/1964 | Duncan | 266/43 |
| 3,229,970 | 1/1966 | Henry | 266/43 |
| 3,617,358 | 11/1971 | Dittrich | 117/105.2 |
| 4,143,104 | 3/1979 | van Konijnenburg | 264/30 |
| 4,192,460 | 3/1980 | Matsuo | 239/79 |
| 4,487,397 | 12/1984 | Antonov et al. | 266/44 |
| 4,497,473 | 2/1985 | Robyn et al. | 266/44 |
| 4,792,468 | 12/1988 | Robyn et al. | 427/422 |
| 4,818,574 | 4/1989 | Mottet et al. | 427/422 |
| 4,823,359 | 4/1989 | Ault et al. | 373/137 |
| 4,900,484 | 2/1990 | Zlamal | 264/30 |
| 4,911,955 | 3/1990 | Mottet et al. | 427/423 |
| 4,981,628 | 1/1991 | Willard | 264/30 |
| 5,002,910 | 3/1991 | Robyn | 501/103 |
| 5,013,499 | 5/1991 | Willard | 264/30 |
| 5,019,454 | 5/1991 | Busse | 428/570 |
| 5,100,594 | 3/1992 | Zvosec et al. | 264/36 |

FOREIGN PATENT DOCUMENTS

| | | |
|---|---|---|
| 172271 | 10/1983 | Japan. |
| 64576 | 4/1984 | Japan. |
| 1253974 | 11/1971 | United Kingdom. |
| 1293524 | 10/1972 | United Kingdom. |
| 1330894 | 9/1973 | United Kingdom. |
| 2035524 | 6/1980 | United Kingdom. |
| 2040911 | 9/1980 | United Kingdom. |
| 2110200 | 6/1983 | United Kingdom. |
| 2154228 | 9/1985 | United Kingdom. |
| 2170191 | 7/1986 | United Kingdom. |
| 2190671 | 11/1987 | United Kingdom. |
| 2213812 | 8/1989 | United Kingdom. |

Primary Examiner—Mark L. Bell
Assistant Examiner—A. Wright
Attorney, Agent, or Firm—Spencer, Frank & Schneider

[57] ABSTRACT

In ceramic welding processes, oxidizing gas and a mixture of refractory and fuel powders are projected against a surface and the fuel is burnt to generate sufficient heat that the refractory powder becomes at least partially melted or softened and a cohesive refractory weld mass is progressively built up against that surface. In order to reduce any tendency for the weld mass to include a low-grade refractory phase and thus promote the refractoriness of that weld mass, the fuel powder is present in a proportion of not more than 15% by weight of the total mixture and includes at least two metals selected from aluminum, magnesium, chromium and zirconium, in that at least the major part by weight of the refractory powder consists of one or more of magnesia, alumina and chromic oxide, and in that the molar proportions of silica and calcium oxide present in the refractory powder (if any) satisfy the following expression:

molar concentration of $SiO_2$ in % $\leq 0.2 +$ molar concentration of CaO in %.

16 Claims, No Drawings

CERAMIC WELDING POWDER MIXTURE

This is a division of application Ser. No. 07/896,908 filed Jun. 11th, 1992, now U.S. Pat. No. 5,242,639, which is a continuation of application Ser. No. 07/513,489, filed Apr. 23rd, 1990, now abandoned.

BACKGROUND OF THE INVENTION

1. Field of the Invention

This invention relates to a ceramic welding process-in which oxidising gas and a mixture of refractory and fuel powders are projected against a surface and the fuel is burnt to generate sufficient heat that the refractory powder becomes at least partially melted or softened and a cohesive refractory mass is progressively built up against that surface. The invention also relates to a ceramic welding powder mixture comprising refractory powder and fuel powder, for use in such a ceramic welding process.

2. Description of the Related Art

Ceramic welding processes are useful for the manufacture of new refractory bodies, for example bodies of rather complicated shapes, but in current commercial practice, they are most often used for lining or repairing hot refractory structures such as furnaces or ovens of various kinds, and they enable eroded areas of the refractory structure (provided that those areas are accessible) to be repaired while the structure is substantially at its operating temperature and in some cases even while the structure is still operating. In any event, it is desirable for there to be no deliberate cooling of the refractory structure from its normal operating temperature. The avoidance of such deliberate cooling tends to promote the efficiency of the ceramic welding reactions, avoids further damage to the structure due to thermal stresses set up by such cooling and/or by subsequent reheating to operating temperature, and also helps to reduce furnace "down time".

In ceramic welding repair processes, refractory powder, fuel powder and oxidising gas are projected against the site to be repaired and the fuel is burnt so that the refractory powder becomes at least partially melted or softened and a refractory repair mass is progressively built up at the repair site. The fuel used typically consists of silicon and/or aluminium, though other materials such as magnesium and zirconium may also be used. The refractory powder may be selected so that the chemical composition of the repair mass matches as closely as possible the composition of the refractory to be repaired, though it may be varied, for example so as to deposit a coating of a higher grade refractory on the base structure. In usual practice, the fuel and refractory powders are projected from a lance as a mixture in a stream of oxidising carrier gas.

Due to the intense heat generated on combustion of fuel powders at or close to the surface to be repaired, that surface also becomes softened or melted, and as a result, the repair mass, which is itself largely fused together becomes strongly adherent to the repaired wall, and a highly effective and durable repair results. Previous disclosures of ceramic welding repair techniques are to be found in British Patents No 1,330,894 and 2,110,200.

Hitherto, one of the most widespread uses of ceramic welding repair processes has been for the refurbishment of coke ovens which are formed from silica refractories. The standard ceramic welding powder most often used for the repair of silica refractories comprises silica together with silicon and optionally aluminium as fuel powder. Silica refractories are in fact the easiest to repair by ceramic welding at least in part because silica refractories are of relatively low refractory grade, so that the temperatures (e.g. 1800° C. or more) reached in the ceramic welding reaction zone easily allow the formation of an adherent cohesive repair mass, and the refractory grade requirements of that repair mass are usually no higher than those of the original silica refractory structure.

We have found, however, that certain problems arise when repairing refractories of higher grades or in other cases when the refractory grade requirements of the ceramic weld mass are particularly stringent. Examples of high grade refractories are: chrome-magnesite, magnesite-alumina, alumina-chrome, magnesite-chrome, chrome, and magnesite refractories, high-alumina refractories, and refractories containing a considerable proportion of zirconium such as CORHART (Trade Mark) ZAC (a fused alumina-zircon-zirconia refractory). For achieving the formation of a ceramic weld mass which has a refractory grade and/or composition approaching or matching those of such high grade refractories, it is not always sufficient to use a standard ceramic welding powder as described above.

A particular problem that arises in the case of a ceramic welding repair mass which is to be subjected to very high temperatures during its working life is the avoidance of a phase within the repair mass which has an insufficiently high softening or melting point. The cohesiveness of a repair mass containing such a phase is impaired at high temperatures and its resistance to corrosion at high temperatures is also not as good as might be hoped for. In general, a refractory phase which is relatively less physically resistant to heat is also more easily attacked chemically at high temperatures.

SUMMARY OF THE INVENTION

It is an object of this invention to provide a ceramic welding process, and a ceramic welding powder for use in such a process, which results in the formation of a weld mass in which the appearance of such a low-grade refractory phase tends to be reduced, and may, in some embodiments of the invention, even be avoided.

According to this invention, there is provided a ceramic welding process in which oxidising gas and a mixture of refractory and fuel powders are projected against a surface and the fuel is burnt to generate sufficient heat that the refractory powder becomes at least partially melted or softened and a cohesive refractory mass is progressively built up against that surface, characterised in that the fuel powder is present in a proportion of not more than 15% by weight of the total mixture and comprises at least two metals selected from aluminium, magnesium, chromium and zirconium, in that at least the major part by weight of the refractory powder consists of one or more of magnesia, alumina and chromic oxide, and in that molar proportions of silica and calcium oxide present in the refractory powder (if any) satisfy the following expression:

molar concentration of $SiO_2$ in % $\leq 0.2 +$ molar concentration of CaO in %.

The invention also provides a ceramic welding powder, being a mixture of refractory and fuel powders, for use in a ceramic welding process in which oxidising gas and the mixture of refractory and fuel powders are projected against a surface and the fuel is burnt to generate sufficient heat that the refractory powder becomes at least partially melted or softened and a cohesive refractory mass is progressively built up against that surface, characterised in that the fuel powder is present in a proportion of not more than 15% by weight of the total mixture and comprises at least two metals selected from aluminium, magnesium, chromium and zirconium, in that at least the major part by weight of the refractory powder consists of one or more of magnesia, alumina and chromic oxide, and in that the molar proportions of silica and calcium oxide present in the refractory powder (if any) satisfy the following expression:

molar concentration of $SiO_2$ in $\% \leq 0.2 +$ molar concentration of CaO in %.

The use of such a powder in such a process gives rise to a ceramic weld mass which is highly resistant to molten materials such as molten metals and metal slags, and molten glass. Such weld masses can have good resistance to corrosive liquids and gases at elevated temperatures such as are encountered, for example, in the working or manufacture of steel, copper, aluminium, nickel and glass, and in crucibles or other chemical reactors exposed to flame action. Such weld masses are also capable of adhering well to high-grade refractory base structures.

The occasional loss of refractory grade in the ceramic weld mass formed is often observed when using a welding powder containing appreciable quantities of silica or silica-forming materials, and it may be attributable to the formation of a vitreous phase in the weld mass at the very high temperatures which can be achieved during the ceramic welding reactions. Such a vitreous phase often has a relatively low melting point, and also it may be relatively easily attacked by molten material such as molten metals, slag and molten glass, and its presence would thus impair the quality of the weld mass as a whole. Silica is often present in refractories whether as a deliberately added constituent or as an impurity. By adopting the present invention, we limit the allowable proportion of silica to an amount which tends to form a refractory weld mass in which such a vitreous phase is greatly reduced or avoided and the refractory grade of the weld mass formed is improved.

The refractory grade of the weld mass formed is improved if, as is preferred, the molar proportions of silica and calcium oxide present in the refractory powder (if any) satisfy the following expression:

molar concentration $SiO_2$ in $\% \leq$ molar concentration of CaO in %. This promotes avoidance of an acidic phase in the weld, and improves its resistance to corrosion by molten glass or metallurgical slags.

It is preferred that the refractory powder is substantially free from silica. The adoption of this feature also militates against the formation of any silica-based vitreous phase in the weld mass formed.

Advantageously, the projected refractory powder substantially consists of one or more of zirconia, magnesia, alumina and chromic oxide. Such materials are capable of forming very high grade refractory masses.

In accordance with the invention, the fuel powder comprises at least two metals selected from aluminium, magnesium, chromium and zirconium. Such fuels combust to give oxides which are of good refractory quality and which are either amphoteric (alumina and zirconia) or basic (magnesia or chromic oxide), and accordingly such fuels will contribute to the formation of a refractory mass which is highly resistant to corrosion by molten glass or metallurgical slags. This feature of the invention also allows considerable flexibility in the choice of fuel elements, and thus in the refractory oxide product afforded on combustion of those elements, so that the composition of the eventual refractory weld mass formed can be varied if desired.

Advantageously, the fuel powder comprises aluminium together with one or more of magnesium, chromium and zirconium. Aluminium has excellent combustion characteristics for the purpose in view, and it is also relatively easily obtainable as a powder.

Preferably, no element constitutes more than 80% by weight of said fuel powder. This has been found beneficial for allowing control of the conditions under which combustion takes place. Thus for example by the adoption of this preferred feature, a main highly reactive fuel ingredient is limited to 80% of the total fuel and the remainder of the fuel, at least 20% by weight, may be made up of a fuel element which reacts more slowly to control the combustion rate. Conversely, a main less active fuel ingredient may have its reaction rate boosted by the addition of at least 20% by weight of one or more fuel elements which reacts more rapidly.

Advantageously, the fuel powder comprises an alloy containing at least 30% by weight of one metal selected from aluminium, magnesium, chromium and zirconium, the balance of the alloy being made up from at least one element other than such selected metal which element is also oxidisable to form a refractory oxide. The use of particles of an alloy as a fuel is particularly valuable in regulating conditions under which combustion takes place.

The projected mixture of powders need not necessarily be wholly free of silicon in order to avoid or reduce the formation of relatively low grade acidic or vitreous siliceous phases. In some circumstances silicon may be present in the fuel powder. Indeed, we have found that the use of silicon as a fuel constituent can have advantages in stabilizing the way in which the ceramic welding reactions proceed. In some preferred embodiments of the invention, therefore, silicon is present in said fuel in the form of an alloy of silicon with at least one of aluminium, magnesium, chromium and zirconium. The use of silicon as an alloying constituent can have a favourable effect on the rate at which the combustion reactions take place during performance of the process of the invention. For example silicon in an alloy with magnesium can have the effect of tempering the rate at which the highly active magnesium burns. Furthermore, because an alloy is an intimate mixture of its constituents, intimacy of the reaction products is promoted, and this militates against the silicon giving rise to any distinct acidic or vitreous phase within the refractory weld mass formed.

In other preferred embodiments of the invention, again in order to promote the avoidance of inducing a siliceous acidic or vitreous phase in the weld mass formed, it is preferred that the molar amount of silicon (if any) present in the mixture is not more than the molar amount (if any) of zirconium. By way of example, the refractory powder could contain a proportion of zirconium orthosilicate (zircon) which is a quite acceptable high-grade refractory ingredient. Alternatively, or in addition, the fuel powder could contain a proportion of elemental silicon which might combine with zirconium in the mixture (whether as elemental zirconium or as zirconia) to form zircon, without inducing an acidic phase in the weld mass formed.

Thus in some such preferred embodiments of the invention, said fuel incorporates elemental silicon in the form of particles having an average grain size of less than 10 micrometers, preferably less than 5 micrometers, and the mixture includes zirconia particles having grain sizes below 150 micrometers, such zirconia particles being present in a molar amount which is at least equal to the molar amount of elemental silicon in the mixture. We have found that making use of this optional feature of the invention promotes the formation of zircon (zirconium orthosilicate) in the weld mass formed as a result of the ceramic welding reactions, so that that mass is substantially free from silica as such, and the risk of forming a vitreous low-grade refractory phase is small. In this way, the advantages of using silicon as fuel can be achieved without also incurring the disadvantages of incorporating a possibly vitreous acidic phase of silica in the weld mass.

In other preferred embodiments of the invention, the projected fuel powder is substantially free from silicon. The adoption of this feature will avoid the formation of any silica-based vitreous phase in the weld mass formed.

In some preferred embodiments of the invention, the projected fuel powder comprises magnesium and aluminium. The oxidation of aluminium and magnesium in suitable proportions can generate ample heat for the performance of the process of the invention, and gives rise to the formation of refractory oxides which can be incorporated into a highly refractory weld mass.

Preferably, the projected fuel powder comprises, by weight, more aluminium than magnesium, for example, aluminium may be present in the fuel in a molar amount about twice that of the magnesium. This promotes the formation of spinel (magnesium aluminate) in the weld mass. Spinel is a very useful high-grade refractory material.

Advantageously, magnesium is incorporated in the projected fuel powder in the form of magnesium-/aluminium alloy. The use of a powdered alloy of these metals rather than a mixture of powders further promotes the formation of spinel rather than the separate oxides as a result of the ceramic welding reactions. The composition of the alloy may be varied, or additions of supplementary aluminium or magnesium may be made in order to regulate the relative proportions of aluminium and magnesium in the fuel powder as desired.

In other preferred embodiments of the invention, the projected fuel powder comprises chromium and aluminium. Such fuel powders are useful for the formation of high-chrome refractory weld masses, and advantageously, such projected fuel powder comprises, by weight, more chromium than aluminium.

Preferably, at least 60% and in some embodiments at least 90% by weight of the projected fuel powder has a grain size below 50 micrometers. This promotes rapid and effective combustion of the fuel powder for the formation of a cohesive refractory weld mass.

The process of the invention is particularly beneficial when applied for the treatment of refractories which are themselves of a basic rather than an acidic character, and accordingly, it is preferred that the process be used for the repair of a structure built of basic refractory material.

DESCRIPTION OF THE PREFERRED EMBODIMENTS

Various specific ceramic welding powders according to the invention will now be described by way of example only.

EXAMPLE 1

A ceramic welding powder comprises, by weight, the following:

| Magnesia | 82% | Mg/Al Alloy | 5% |
|---|---|---|---|
| Zirconia | 10 | Al grains | 3 |

The magnesia used had grain sizes up to 2 mm. The zirconia had grain sizes below 150 micrometers. The Mg/Al alloy contained a nominal 30% by weight magnesium and 70% aluminium, with grain sizes below 100 micrometers and an average grain size of about 42 micrometers, and the aluminium was in the form of grains having a nominal maximum size of 45 micrometers.

The magnesia used had a purity of 99% by weight. It contained 0.8% calcium oxide by weight, and 0.05% silica by weight. The molar ratio of $SiO_2$ to $CaO$ in the magnesia was therefore 1:17.4.

Another magnesia composition suitable for use has a purity of 98% by weight. It contains 0.6% calcium oxide by weight, and 0.5% silica by weight. The molar ratio of $SiO_2$ to $CaO$ in this magnesia composition is therefore 1:1.28.

Such a powder may be projected at a rate of 1 to 2 tonnes per hour from a lance well known per se in the ceramic welding art using oxygen as carrier gas for the repair of a steel converter formed from basic magnesia refractory, the repair site being at a temperature of 1400° C. immediately before such projection.

EXAMPLE 2

A ceramic welding powder comprises, by weight, the following:

| Magnesia | 82% | Al grains | 3% |
|---|---|---|---|
| Zirconia | 10 | Al flake | 3.5 |
| | | Mg grains | 1.5 |

The magnesia, zirconia and aluminium grains had grain sizes as given in Example 1. The composition of the magnesia was one of those given in Example 1. The magnesium had a nominal maximum size of about 75 micrometers and an average grain size of less than 45 micrometers. The aluminium flake had a specific surface (measured by Griffin permeametry) of over 700 $cm^2/g$.

Such a powder may be projected as described in Example 1 for the repair of a steel converter formed from magnesia-chrome refractory, the repair site being at a temperature of 1400° C. immediately before such projection.

EXAMPLE 3

A ceramic welding powder comprises, by weight, the following:

| Chromic oxide | 82% | Mg/Al Alloy | 5 |

| Zirconia | 10 | Al grains | 3 |

The chromic oxide had grain sizes of up to 2 mm. The other materials were as specified in Example 1.

The chromic oxide was substantially free from silica, the merest traces being found on analysis.

Such a powder may be projected at a rate of 150 to 200 kg/h from a lance well known per se in the ceramic welding art using oxygen as carrier gas, for the repair of a copper converter formed from magnesia-chrome refractory, the repair site being at a temperature of 1100° C. immediately before such projection.

EXAMPLE 4

A ceramic welding powder comprises, by weight, the following:

| Chromic oxide | 82% | Al grains | 3 |
| Zirconia | 10 | Al flake | 3.5 |
| | | Mg grains | 1.5 |

The chromic oxide was as specified in Example 3. The other materials were as specified in Example 2.

Such a powder may be projected at a rate of 150 to 200 kg/h from a lance well known per se in the ceramic welding art using oxygen as carrier gas, for the repair of a steel degassing nozzle formed from magnesia-chrome refractory, the repair site being at a temperature of 1100° C. immediately before such projection.

In a variant of this Example, the magnesium was replaced by zirconium having a mean grain size of about 10 to 15 micrometers, taking all desired precautions having regard to the well known high reactivity of zirconium.

EXAMPLE 5

A ceramic welding powder comprises, by weight, the following:

| Chromic oxide | 90% | Cr | 8 |
| | | Al flake | 2 |

The chromium was in the form of grains having a nominal maximum grain size of about 100 micrometers and an average grain size of between 25 and 30 micrometers. The chromic oxide was as specified in Example 3. The aluminium flake had a specific surface (measured by Griffin permeametry) of over 7000 cm$^2$/g.

Such a powder may be projected at a rate of 40 kg/h from a lance well known per se in the ceramic welding art using oxygen as carrier gas, for the repair of CORHART (Trade Mark) ZAC (fused alumina-zircon-zirconia) refractory blocks located at the level of the surface of the melt in a glass-melting furnace, the repair site being at a temperature of 1500° C. to 1600° C. immediately before such projection.

The powder is equally suitable for the repair of a chrome refractory (that is, a refractory containing more than 25% chromic oxide and less than 25% magnesia) again located at the level of the surface of the melt in a glass-melting furnace.

EXAMPLE 6

A ceramic welding powder comprises, by weight, the following:

| Magnesia | 72% | Al grains | 3% |
| Zirconia | 10 | Mg/Al Alloy | 5 |
| Carbon | 10 | | |

The carbon was coke having an average diameter of about 1.25 mm. The other materials were as specified in Example 1. Such a powder may be projected as described in Example 1 for the repair of a steel converter formed from a magnesia-carbon refractory.

EXAMPLE 7

A ceramic welding powder comprises, by weight, the following:

| Magnesia | 82% | Si | 2% |
| Zirconia | 10 | Mg | 4 |
| | | Al flake | 2 |

The silicon was in the form of grains having an average grain size of 4 micrometers. The zirconia had a nominal maximum grain size of 150 micrometers. The other materials were as specified in previous Examples. Such a powder may be projected at a rate of 150 kg/h for the repair of a magnesia basic refractory steel ladle.

EXAMPLE 8

A ceramic welding powder comprises, by weight, the following:

| Alumina | 92% | Mg | 2% |
| | | Al grains | 6 |

The alumina used was an electrocast alumina containing, by weight, 99.6% Al$_2$O$_3$. It contained 0.05% CaO, and 0.02% SiO$_2$. The molar ratio of SiO$_2$ to CaO in this alumina is therefore 1:2.68.

The alumina had a nominal maximum grain size of 700 micrometers and the aluminium and magnesium had grain sizes as specified in Example 2. Such a powder may be used as described in Example 5 for the repair of CORHART (Trade Mark) ZAC refractory blocks in a glass melting tank furnace beneath the working surface level of the melt after the tank has been partially drained to give access to the repair site.

In a variant of this Example, the electrocast alumina was replaced by tabular alumina.

The tabular alumina used had a nominal maximum grain size of 2 mm, and contained, by weight, 99.5% Al$_2$O$_3$. It contained 0.073 mol % CaO, and 0.085 mol % SiO$_2$. The molar ratio of SiO$_2$ to CaO in this alumina was accordingly 1:0.86, though it does clearly satisfy the expression:

molar concentration of SiO$_2$ in % $\leq$ 0.2 + molar concentration of CaO in %.

EXAMPLE 9

A ceramic welding powder comprises, by weight, the following:

| Magnesia | 80% | Mg/Si Alloy | 5% |

| Zirconia | 10 | Mg/Al Alloy | 5 |

The magnesium/silicon alloy contained equal weight proportions of the two elements and had an average grain size of about 40 micrometers. The other materials were as specified in Example 1. Such a powder may be projected as described in Example 1 for the repair of a refractory wall formed from a basic magnesia refractory.

EXAMPLES 10 TO 16

In variants of Examples 1 to 4, 6, 7 and 9, the zirconia was replaced by tabular alumina as described in Example 8.

In variants of Examples 1, 3, 6, 9, 10, 12, 14 and 16, the alloy containing 30% magnesium and 70% aluminium had a maximum grain size of not more than 75 micrometers and an average grain size of less than 45 micrometers. In yet further variants, the alloy contained equal weights of magnesium and aluminium.

What is claimed is:

1. A ceramic welding powder, comprising:
    a mixture of a refractory powder and a fuel powder for use in a ceramic welding process in which oxidizing gas and the mixture are projected against a surface and the fuel powder is burnt to generate sufficient heat that the refractory powder becomes at least partially melted or softened and a cohesive refractory mass is progressively built up against the surface,
    wherein the fuel powder is present in a proportion of not more than 15% by weight of the total mixture and comprises at least two metals selected from the group consisting of aluminum, magnesium, chromium and zirconium,
    wherein at least the major part by weight of the refractory powder consists of at least one refractory selected from the group consisting of magnesia, alumina and chromic oxide, and wherein the refractory powder contains at least one of silica and calcium oxide present in molar proportions which satisfy the following expression:
    molar concentration of $SiO_2$ in % $\leq 0.2+$ molar concentration of CaO in %.

2. The ceramic welding powder according to claim 1, wherein the molar proportions of the at least one of silica and calcium oxide present in the refractory powder satisfy the following expression:
    molar concentration of $SiO_2$ in % $\leq$ molar concentration of CaO in %.

3. The ceramic welding powder according to claim 1, wherein the refractory powder is substantially free from silica.

4. The ceramic welding powder according to claim 1, wherein the refractory powder further comprises zirconia.

5. The ceramic welding powder according to claim 1, wherein the fuel powder comprises aluminium together with at least one of magnesium, chromium and zirconium.

6. The ceramic welding powder according to claim 1, wherein no single element constitutes more than 80% by weight of said fuel powder.

7. The ceramic welding powder according to claim 1, wherein the fuel powder comprises an alloy containing at least 30% by weight of a metal selected from the group consisting of aluminum, magnesium, chromium and zirconium, the balance of the alloy being made up from at least one element other than said metal, which at least one element other than said metal is oxidizable to form a refractory oxide.

8. The ceramic welding powder according to claim 1, wherein silicon is present in said fuel powder, and wherein the silicon is in the form of an alloy of silicon with the at least one metal selected from the group consisting of aluminum, magnesium, chromium and zirconium.

9. The ceramic welding powder according to claim 1, wherein elemental silicon and zirconium are present in the projected mixture, and wherein the elemental silicon is present in a molar amount which does not exceed that of zirconium calculated as elemental zirconium.

10. The ceramic welding powder according to claim 9, wherein elemental silicon is present in said fuel powder in the form of particles, wherein the elemental silicon particles having an average grain size of less than 5 micrometers, and wherein the mixture includes zirconia particles having grain sizes below 150 micrometers, the zirconia particles being present in a molar amount which is at least equal to the molar amount of elemental silicon in the mixture.

11. The ceramic welding powder according to claim 1, wherein the fuel powder is substantially free from silicon.

12. The ceramic welding powder according to claim 1, wherein the fuel powder comprises magnesium and aluminum.

13. The ceramic welding powder according to claim 12, wherein the fuel powder comprises, by weight, more aluminum than magnesium.

14. The ceramic welding powder according to claim 12, wherein the magnesium in the fuel powder is present in the form of an alloy of magnesium and aluminum.

15. The ceramic welding powder according to claim 1, wherein the fuel powder comprises chromium and aluminum.

16. The ceramic welding powder according to claim 15, wherein the fuel powder comprises, by weight, more chromium than aluminum.

* * * * *